Figure 1:
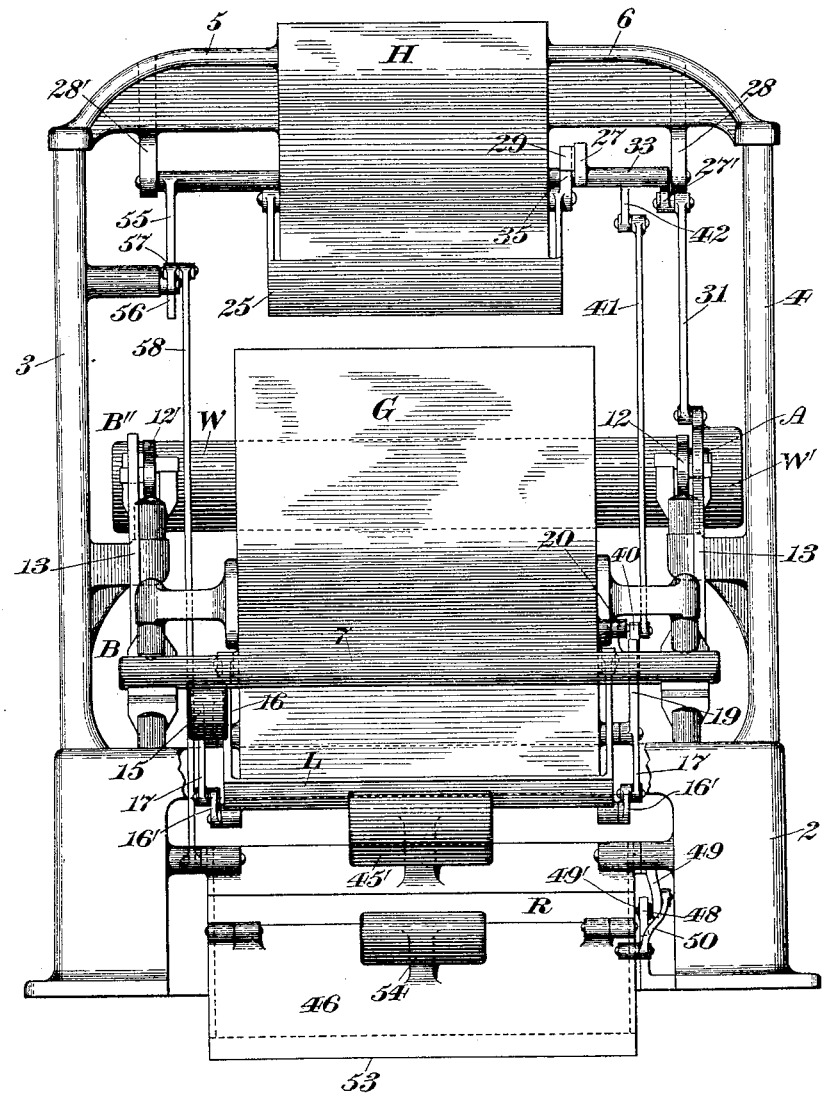

(No Model.)  3 Sheets—Sheet 1.

F. H. RICHARDS.
WEIGHING MACHINE.

No. 579,455.  Patented Mar. 23, 1897.

Witnesses;
O. W. Smith.
Fred. J. Dole.

Inventor,
F. H. Richards.

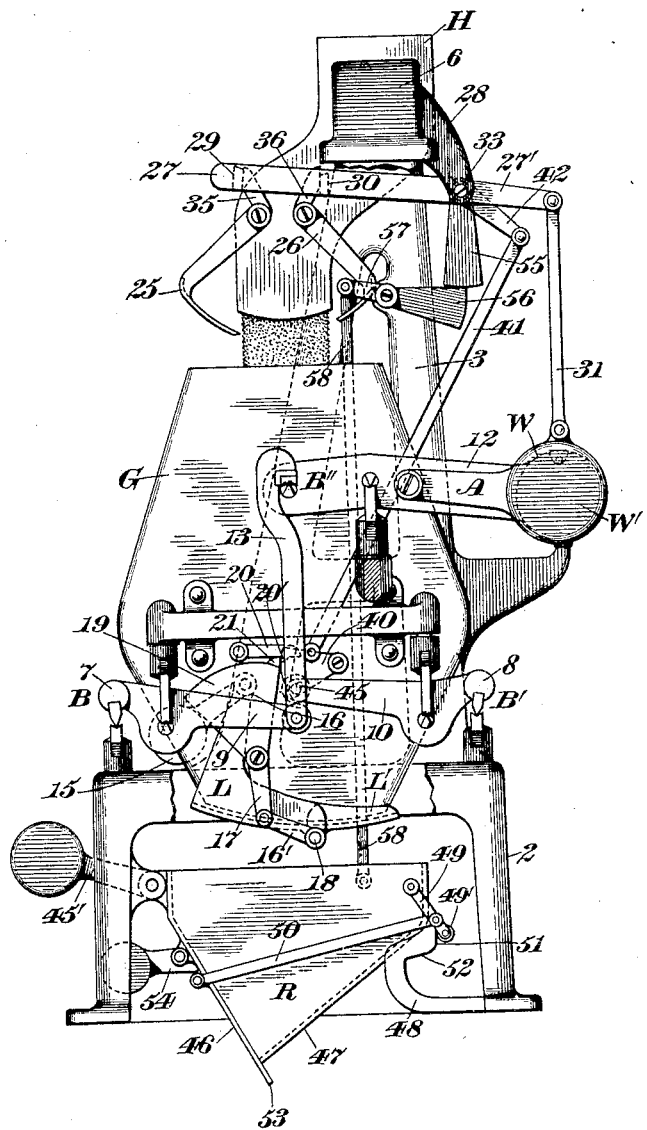

(No Model.)  3 Sheets—Sheet 3.
F. H. RICHARDS.
WEIGHING MACHINE.
No. 579,455.  Patented Mar. 23, 1897.
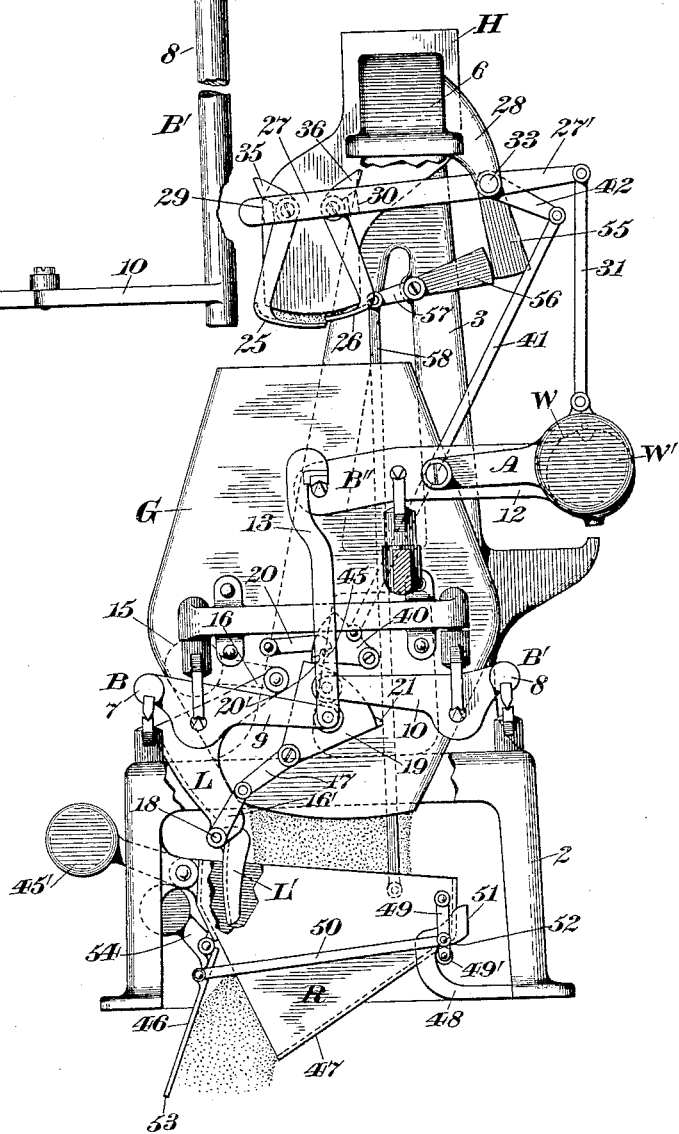
Witnesses:
O. W. Smith.
Fred. J. Dole.
Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 579,455, dated March 23, 1897.

Application filed December 19, 1896. Serial No. 616,296. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved machine of this character for automatically weighing and delivering various classes of granular and other free-flowing materials with promptness and precision.

In the drawings accompanying and forming part of this specification, Figure 1 is a front elevation of a weighing-machine embodying my present improvements. Figs. 2 and 3 are end elevations of the machine as seen from the right in Fig. 1 and show the positions occupied by the operative parts at the commencement and close of a weighing operation, respectively; and Fig. 4 is a detail in plan of part of the beam mechanism.

Similar characters designate like parts in all the figures of the drawings.

The framework for sustaining the various sets of mechanisms may be of any suitable structure, it comprising in the present case the base or bed 2, the end frames or columns 3 and 4, which rise therefrom, and the brackets 5 and 6, which extend oppositely from the supply hopper or chute H, of ordinary construction, and which constitutes a convenient means for delivering a stream of material to the load-receiver of the weighing mechanism.

The weighing mechanism is made up of a load-receiver and beam mechanism therefor, the load-receiver consisting of a bucket G of the "single-chambered" "vertically-reciprocatory" type. The load-receiver or bucket is mounted upon a plurality of beams, two of such bucket-carrying beams being illustrated and they being designated by B and B', respectively, and one of which is adapted to have a rolling contact with the other.

The beams B and B' each consist of a shaft having a series of bucket-carrying arms extending therefrom and in parallelism, the arms of one of said beams bearing against those of the other.

The shaft for the beam B is designated by 7, and the shaft for the beam B' is designated by 8, said shafts being furnished with depending pivots or knife-edges which rest upon beam-supports or notched bearings on the base 2, whereby the shafts may have the necessary amount of rocking movement.

The supports for the bucket are located between the beam-supports on the base, and they consist of knife-edges carried on the arms of the beams B and B', upon which rest notched bearings on the opposite sides of the bucket, the arms for the beam B being designated by 9 and 9', respectively, while those of the beam B' are designated by 10 and 10', respectively, the arms 10 and 10' being equipped with antifriction-rolls, the peripheries of which are contiguous to the peripheries of similar rolls on the arms 9 and 9' of the beam B, as said beams reciprocate during the weighing and return movement of the load-receiver or bucket G.

An independently-mounted weight-carrying beam is illustrated at B'', supported independently of the hereinbefore-mentioned series of beams and operatively connected to one of them, said beam B'' consisting of a pair of parallel arms 12 and 12', respectively, which are joined at the rear by the combined counterweight and connecting-shaft W.

The beam B'' will be fulcrumed upon brackets extending inward from the side frames 3 and 4 by means of ordinary knife-edge and notch-bearing connection. The beam B'' is represented operatively connected to the bucket-carrying beam B, a link being shown at 13 pivoted to the inner end of the beam-arm 9 and having at its upper end a hook provided with a notched bearing which works against a knife-edge on the beam-arm 12, whereby a movement in unison of the respective beams is obtained.

The bucket G will have the usual discharge-outlet through which the loads are discharged, and for controlling the passage of material through said outlet I provide two closers, a main closer, which is designated by L, and an auxiliary closer, which is designated by L', the main closer, which is preferably connected to the bucket, being intended to partially cover the discharge-outlet, and the auxiliary closer being preferably connected to the main closer to cover the remainder of said outlet.

The closer L is pivotally connected to the bucket, its point of connection thereto being relatively remote from the discharge-outlet of the bucket, whereby as it swings open it can wholly uncover said outlet to permit the rapid discharge of the bucket contents.

The closers L and L' consist of slightly-curved plates, which, when said members are shut, as represented in Fig. 2, are in alinement, thereby forming a composite structure, the auxiliary closer L' being shiftable relatively to the main closer on the opening thereof and being when in such shifted position disposed at an angle to the main closer, so that it will take a firm hold on the discharged mass to retard or impede the shutting movement sufficiently to allow the complete emptying of the bucket.

For shutting the closer L, I provide a weight 15, which is on an arm extending from the closer-arm 16.

When the closers L and L' are released at the proper stage in the operation of the machine, they will be forced open simultaneously, and the closer L' will be thrown out of alinement with the closer L by the action of the escaping material, whereby such auxiliary closer may act in the manner hereinbefore set forth.

To return the closer to its normal position in alinement with its companion, I locate between the same and the bucket a toggle fixed, respectively, to said auxiliary closer and to the bucket, the toggle members being designated by 16' and 17, the first-mentioned being affixed to the projecting auxiliary-closer pivot 18, while the member 17 is pivoted to the bucket G and has formed integral therewith the segmental rocker 19. As the two closers are opened the several pivots of the toggle members 16' and 17 will be thrown approximately into alinement, this action being reversed on the shutting of the closers.

To hold the closers against opening during the supply of a load, I provide the gravity-latch 20, which is pivotally mounted upon the bucket G and which has a catch or shoulder 20' at one end for engaging the coöperating boss or lug 21 on the rocker 19, as represented in Fig. 2.

The discharge-opening of the hopper or chute H is located over the bucket to deliver the supply-stream thereto; and for controlling the passage of such stream I provide a pair of valves, (designated, respectively, by 25 and 26,) they being pivotally connected to the chute or hopper H at opposite sides thereof, said valves being successively closable, the valve 25, which constitutes a main or reducing valve, being operative, as it closes, to reduce the volume of the supply-stream which flows from the hopper H, which reduced stream is subsequently cut off by the auxiliary or cut-off valve 26.

For effecting the opening and closing of the valves alternately I provide the actuator 27, which is oscillatory, it being in the form of an arm extending from the shaft 33, which is supported for rocking movement between the brackets 28 and 28', respectively, said actuator being furnished with projections 29 and 30, coöperative, respectively, with the valves and located at different points from the axis of movement of said actuator, whereby the successive closure of said valves is obtained on the downstroke of said actuator with the bucket. The shaft 33 is furnished with the rearwardly-extending arm 27', which is connected by the link 31 to the weight W' of the auxiliary beam A, that is shiftably mounted on the counterpoised side of the main beam B'', said auxiliary beam having an ascending movement with the weight of the main beam as the bucket descends, but it is held against return movement with said main beam by interlocking stop mechanism, as will hereinafter appear, it being adapted when released to draw the link 31, and consequently the arm 27', down to transfer to the actuator 27 the necessary power to open the two valves.

The weight W' of the auxiliary beam A is provided with a pin which lies in a recess on the adjacent weight W of the main beam B'', whereby an ascending movement in synchronism of the two beams is had on the descent of the bucket.

The valve 25 is furnished with a cam 35, the valve 26 being furnished with a similar cam 36, along the faces of which the projections 29 and 30 are adapted to run as the weighing mechanism reciprocates.

At the commencement of operation, as shown in Fig. 2, the bucket G being in its highest position and the actuator 27 being at the limit of its upstroke, the valves 25 and 26 will be wide open to permit the full volume of the supply to flow into the bucket G, the projections 29 and 30 being in contact with the upper straight faces of the two valve-cams 35 and 36. When a certain proportion of the load has been received by the bucket, the beams B and B' will descend and the counterpoised side of the beam B'' will be caused simultaneously to ascend, thereby raising the auxiliary beam A, so that the rod 31, and hence the arm 27', may be thrust upward, whereby the actuator 27 will be moved in a direction corresponding with that of the bucket, and the projections 29 and 30 will be caused to ride along the upper straight portions of the faces of the two cams 35 and 36, respectively, of the valves 25 and 26.

At the commencement of the poising period the projection 29 will have passed out of contact with and below the upper straight face of the cam 35, thereby releasing the valve 25, so that it may be promptly shut, the same action being repeated subsequently with respect to the valve 26, said valves being self-closing, they having a preponderance of weight below their centers to accomplish this result. On the upstroke of the rod or actuator 27 with the empty bucket the projections 29 and 30 by riding along the working faces of the cams 35 and 36 will open the two valves.

Reciprocally-effective stops are provided operative, respectively, with the valves and with the closers, they being adapted to hold said valves shut while the closers are open, and vice versa. The rocker or segmental plate 19, to which I have hereinbefore referred, constitutes one of said stops, the coacting stop being shown at 40 and consisting of a segmental plate pivotally mounted upon the bucket and connected by the relatively long rod 41 to the rock-arm 42 on the actuator-shaft 33. The operation of said stops will be clearly evident from an inspection of Figs. 2 and 3. During the weighing operation the stop 19 will be substantially in contact with the curved face of the stop 40, so that should the latch 20 be tripped too soon the oscillation of the stop 19 will be blocked, the closers L and L' being thereby held shut and until the valves 25 and 26 have cut off the supply-stream. As the actuator 27 is being lowered in the manner hereinbefore set forth the rock-arm 42, and consequently the rod 41, will be oppositely moved, thereby elevating the stop 40, so that when the valves have reached their fully-closed positions, as shown in Fig. 3, the stop 40 will have crossed bodily the plane of the curved face of the stop 19, thereby releasing said stop 19, so that if the latch 20 be disengaged from the boss 21 of the stop 19 the latter, as the closers open, will be swung about its center, and in so doing its curved face will be contiguous to the stop 40, whereby retractive movement of the latter, and hence of the actuator 27, will be prevented, and this relation will continue until the closers L and L' have been shut.

The stop 40 constitutes a tripper for the latch, it having a pin 45 extending inward therefrom, which at about the time the load is completed is adapted to engage said latch and by lifting it to disengage it from the boss 21 on the stop 19, and when the load is fully completed this operation will have been accomplished, thereby freeing the two closers, so that they can be then forced by the weight of the load in the bucket.

There is illustrated at R a regulator supported beneath the bucket G for reciprocatory movement, it being in the form of a hopper located to receive and to be depressed by a load from the bucket, the mass which is confined within said regulator-hopper being acted upon by the auxiliary closer L' to retard the return movement of the latter with its companion L. The regulator-hopper R is pivotally supported within the base 2 and is furnished with the counterweighted arm 45' for returning it to its highest position on the discharge of the contents thereof. The bottom of the regulator or hopper R, which leads toward the outlet thereof, will be preferably inclined to permit the material which is received from the bucket to readily pass through said outlet.

For the purpose of retaining the material within the hopper R for a limited period of time I provide the outlet thereof with a valve 46, which is pivoted to one of the walls of the regulator, completely covering the same and extending below the inclined bottom 47 for a short distance, locking means being provided to hold said valve shut when the regulator is in its highest position, said locking means being also operable to retard the ascent of the emptying-regulator.

The locking means consists in the present case of a cam 48, secured within the base 2, and with which the arm 49, pivoted to the regulator R, is adapted to coöperate, said arm being connected to the valve 46 by the interposed link 50. The arm 49 has the antifriction-roll 49', forming a part thereof, which runs along the faces of said cam on the descent of the regulator with a supply of material.

When the regulator-hopper R is in its highest position, (see Fig. 2,) the antifriction-roll 49' will be in contact with the vertical face 51 of the cam 48, so that when the material is discharged into said regulator from the bucket the valve 46 will be held closed for a sufficient length of time to allow said regulator to be completely filled. When, however, the regulator is depressed and has nearly reached the limit of its downstroke, the antifriction-roll 49' will be carried opposite the oblique face 52 of the cam 48, thereby releasing the valve 46, so that it can be forced open by the weight of the material therein, said valve, as it opens, through the link 50 swinging the arm 49 in a corresponding direction and causing the roll 49' to ride along the oblique portion or face 52 of the locking-cam, and when this action takes place the return or ascending movement of the regulator-hopper will be prevented by the cam 48 and until the valve has nearly reached its closed position.

To prevent the too-prompt shutting of the valve 46, I extend the discharge edge or lip thereof, 53, below the plane of the inclined bottom 47 of the regulator, whereby such valve-discharge edge is adapted to take hold of the mass which flows from the regulator to thereby accomplish the result specified and to permit the complete discharge of said regulator.

To shut the valve 46, I provide the counterweighted arm 54 thereon.

In connection with the supply-valves and the regulator-hopper I employ reciprocally-effective stops. The valve-operative stop is designated by 55, it being fixed to the actuator-shaft 33, the companion stop being designated by 56 and being pivotally supported by the end frame 4 and having an oppositely-extending arm 57, connected by the relatively long rod 58 to the regulator-hopper R, said stops being in the form of segmental blades.

When the valves are open, the segmental stop 56 will be in contact with the curved face of the stop 55, whereby the depression of the regulator-hopper will be prevented by said stop 55, which is located to block the action of its mate. When, however, the two valves have been fully closed, the stop 55 will have crossed the plane of the curved face of the stop 56 by the action of the shaft 33 in rocking, thereby releasing the stop 56, so that when the regulator R receives the load from the bucket and is depressed the stop 56 will be thrust upward, as shown in Fig. 3, and in contact with the stop 55, whereby retractive movement of the latter, and hence the opening of the two valves 25 and 26, will be prevented, and will continue to be so until the regulator-hopper R has reached the limit of its upstroke.

When the load is being emptied by the bucket in the regulator R, the counterpoising side of the beam B″ by dropping and overpoising the lightened bucket G will raise the same, and said beam will drop away from the auxiliary beam A, which is locked against return movement by the interlocking stop 56. When, however, the stop 56 releases the stop 55, the auxiliary beam A may return to its primary position, thereby drawing the rod 31, and consequently the arm 27′, downward, to force the actuator 27 upward for opening the two valves 25 and 26.

The operation of the hereinbefore-described machine, briefly stated, is as follows: Fig. 2 represents the positions occupied by the respective parts at the commencement of operation, the closers L and L′ being shut and so held by the latch 20, which is in engagement with the rocker or stop 19, and both valves 25 and 26 being wide open the supply-stream will flow into the empty bucket. When a certain proportion of the load to be weighed has been received by the bucket, it, with the beams B and B′, with the poising side of the beam B″ will descend, thereby raising the counterpoised side of the beam B″ with the auxiliary beam A, whereby the rod 31 and the arm 27′ will be elevated, so that the actuator-shaft 33 will be rocked to swing the actuator 27 downward. As the actuator thus moves the two projections 29 and 30 will successively pass out of contact with the vertical portions of the valve-cams 35 and 36, so that the two valves may be successively closed to cut off the supply-stream to the hopper H. At this time the projection 45 on the stop 40 will have been carried against and will have lifted the closer-latch 20, to disengage it from the boss 21 on the rocker or stop 19, thereby releasing the two closers L and L′, so that they can be then forced open by the weight of the contents within the bucket, which are discharged into the regulator-hopper R, depressing said hopper and subsequently permitting the material to escape therefrom by the opening of the valve 46. When the material has run through the regulator R, it will be caused to ascend by its counterweight 45′. Prior to this last-mentioned operation the two closers L and L′ will be shut by the counterweight 15, and the several remaining parts of the machine will be caused to return to their initial positions.

Having described my invention, I claim—

1. The combination, with a load-receiver, of a series of supporting scale-beams therefor, said beams having a rolling contact with each other.

2. The combination, with a load-receiver; of a series of supporting-beams therefor, each consisting of a shaft and a plurality of arms extending from said shaft in parallelism, the arms of said beams bearing against each other, and said arms having supports for the load-receiver, located between the shaft-supports; and an independently-mounted beam connected to one of said series and consisting of a pair of longitudinal arms joined at the rear by a combined connecting-shaft and counterweight.

3. The combination, with a load-receiver; of a series of supporting-beams therefor, each consisting of a shaft and a plurality of arms extending from said shaft in parallelism, the arms of one of said beams bearing against those of another, and said arms having supports for the load-receiver, located between the shaft-supports; an independently-mounted beam consisting of a pair of arms joined at the rear by a combined connecting-shaft and counterweight; and a link connection between one of the arms of said last-mentioned beam and one of said series of beams.

4. The combination, with a load-receiver, of a series of supporting-beams therefor, each consisting of a shaft and a plurality of arms extending from said shaft in parallelism, said arms bearing against each other, and said arms having supports for the load-receiver, located between the shaft-supports; an independently-mounted beam consisting of a pair of arms joined by a combined connecting-shaft and counterweight; a connection between said last-mentioned beam and one of the first-mentioned beams; stream-supplying means; a pair of valves; an oscillatory valve-actuator having projections thereon located at different points from its axis of movement; and an auxiliary beam shiftably mounted on the counterweighted beam and connected with said valve-actuator.

5. The combination, with weighing mechanism including a load-receiver, of stream-supplying means; a pair of valves; an oscillatory valve-actuator having projections located thereon at different points from the axis of movement thereof; a valved regulator-hopper situated to receive the contents discharged from the load-receiver; and reciprocally-effective stops operative, respectively, with said valves and with the regulator-hopper.

6. The combination, with a load-receiver and with load-discharging mechanism therefor, of a reciprocatory regulator situated below the load-receiver and having an outlet, said regulator being positioned to receive and to be depressed by a load from said load-receiver; a valve for said outlet; and locking means operable to hold said valve shut when the regulator is in its highest position.

7. The combination, with load-receiver and with a load-discharging mechanism therefor; of a regulator located to receive and to be depressed by a load from said load-receiver, and having an outlet; a valve for said outlet; and locking means operable to hold the valve shut when the regulator is in its highest position, and also to release said valve at a predetermined point in the movement of the regulator.

8. The combination, with a load-receiver, of load-discharging mechanism therefor; a reciprocatory regulator located to receive and to be depressed by a load from said load-receiver, and having an outlet; a valve for said outlet; and locking means operable to hold said valve shut when the regulator is in its highest position, said locking means being also operable to retard the return movement of the regulator.

9. The combination, with a load-receiver and with load-discharging mechanism, of a valved regulator located to receive and to be depressed by a load from said load-receiver; a cam; and an arm on the regulator, connected to the valve therefor and located to travel along the working face or faces of said cam on the movement of the regulator.

10. The combination, with a load-receiver and with load-discharging mechanism, of a valved regulator located to receive and to be depressed by a load on the load-receiver; a cam; and an arm on the regulator, connected to the valve therefor by a link and located to travel along the working face or faces of said cam on the movement of said regulator.

11. The combination, with a load-receiver and with load-discharging mechanism therefor, of a reciprocatory counterweighted regulator located to receive and to be depressed by a load discharged from said load-receiver; a valve for said regulator; and locking means operable to hold said valve shut when the regulator is in its highest position.

12. The combination, with a load-receiver and with load-discharging mechanism therefor, of a reciprocatory regulator located to receive and to be depressed by a load from the load-receiver, and having an outlet; a counterweighted valve for said outlet; and locking means operable to hold said valve shut when the regulator is in its highest position.

13. The combination, with a load-receiver and with load-discharging mechanism therefor, of a regulator-hopper located to receive and to be depressed by a load from the load-receiver, and having an inclined bottom leading toward an outlet; a valve for said outlet, extending below said inclined bottom; and locking means operable to hold said valve shut when the regulator is in its highest position.

14. The combination, with stream-supplying means, of a pair of valves therefor; and an oscillatory valve-actuator having projections thereon operative, respectively, with the valves and located at different points from the axis of the valve-actuator.

15. The combination, with a load-receiver and with a main beam therefor, of an auxiliary beam shiftably carried by the main beam and movable in one direction therewith; means for preventing the return movement of said auxiliary beam with the main beam; stream-supplying means; a pair of stream-controlling valves; and an oscillatory actuator having projections thereon located at different points from the axis thereof and coöperative with said valves, said actuator being connected to the auxiliary beam.

16. The combination, with a reciprocatory load-receiver having a discharge-outlet; of a closer for said outlet, connected to the load-receiver; stream-supplying means; a pair of valves; a shaft carrying an actuator for said valves, said actuator having projections located at different points from its axis of movement; a stop connected with said shaft; and a coöperating stop operative with the closer.

17. The combination, with a load-receiver and stream-supplying means therefor, of a pair of valves; an actuator for said valves, having projections located at different points from its axis of movement; a rock-shaft on which said actuator is mounted; and a main scale-beam shiftably supporting an auxiliary scale-beam, said auxiliary scale-beam being connected with the actuator rock-shaft.

18. The combination, with a load-receiver and with a main scale-beam therefor, of an auxiliary scale-beam shiftably carried by the main scale-beam; a pair of valves; an oscillatory valve-actuator having projections located at different points from its axis of movement; a shaft for carrying said valve-actuator, said valve-actuator being connected by a link to the auxiliary scale-beam; a regulator-hopper situated to receive the contents discharged from the load-receiver; a stop connected with said rock-shaft and a coöperating stop connected with said regulator-hopper.

19. The combination, with a load-receiver having a discharge-outlet, of a closer for said outlet; a main scale-beam; an auxiliary scale-beam shiftably supported by said main scale-beam; stream-supplying means; a pair of valves; an oscillatory valve-actuator having projections located at different points from its axis of movement; a shaft for supporting said valve-actuator and having a crank-arm; a pair of stops mounted on the load-receiver, one of which is connected with the closer and the other with said crank-arm; a connection between said valve-actuator and the auxiliary scale-beam; a regulator-hopper situated to receive the contents discharged from the load-receiver; and a second pair of stops, one of which is mounted on said rock-shaft and the other of which is connected with said regulator-hopper.

20. The combination, with a bucket having a closer and with holding means therefor including a latch, of a stop connected to said closer; stream-supplying means; a valve; and a stop operative with said valve and located to coact with said first-mentioned stop, and constituting also a tripper for said latch.

21. The combination, with a load-receiver, of a regulator located to receive and to be depressed by a load from the bucket; stream-supplying means; a pair of valves; a rock-shaft carrying a valve-actuator furnished with projections and operative with the valves, and located at different points from the axis of said valve-actuator; a stop on said rock-shaft; and a coöperating stop connected to the regulator.

FRANCIS H. RICHARDS.

Witnesses:
FRED. J. DOLE,
HEATH SUTHERLAND.